United States Patent [19]

Knight et al.

[11] 3,877,522

[45] Apr. 15, 1975

[54] USE OF RADIATION-INDUCED POLYMERS IN CEMENT SLURRIES

[75] Inventors: Bruce L. Knight; John S. Rhudy; William B. Gogarty, all of Littleton, Colo.

[73] Assignee: ICI United States Inc., Wilmington, Del.

[22] Filed: Nov. 6, 1972

[21] Appl. No.: 303,736

[52] U.S. Cl. .................. 166/295; 166/247; 166/294
[51] Int. Cl. ............................................. E21b 33/13
[58] Field of Search ............ 166/247, 275, 294, 295

[56] References Cited
UNITED STATES PATENTS

| | | | |
|---|---|---|---|
| 3,114,419 | 12/1963 | Perry et al. | 166/295 |
| 3,152,641 | 10/1964 | Boyd | 166/295 |
| 3,336,979 | 8/1967 | Ingraham et al. | 166/294 |
| 3,490,533 | 1/1970 | McLaughlin | 166/295 |
| 3,493,529 | 2/1970 | Krottinger et al. | 166/295 |
| 3,502,149 | 3/1970 | Pence | 166/295 |
| 3,749,172 | 7/1973 | Hessert et al. | 166/295 |

FOREIGN PATENTS OR APPLICATIONS

| | | | |
|---|---|---|---|
| 683,476 | 3/1964 | Canada | 166/275 |

*Primary Examiner*—Stephen J. Novosad
*Assistant Examiner*—Jack E. Ebel
*Attorney, Agent, or Firm*—Joseph C. Herring; Richard C. Willson, Jr.; Jack L. Hummel

[57] ABSTRACT

Water loss from cement slurries is reduced by incorporating within a cement slurry a polymer obtained as a product of radiation-induced polymerization of acrylamide and/or methacrylamide and acrylic acid, methacrylic acid, and/or alkali metal salts thereof. The polymerization is preferably carried out in 10-60% aqueous monomer solution with gamma radiation. The aqueous monomer solution preferably contains 25-99% acrylamide and 75-1% sodium acrylate. The polymer can be present in concentration of about 0.001 to about 3.0 weight percent, based on the aqueous phase of the slurry.

16 Claims, No Drawings

USE OF RADIATION-INDUCED POLYMERS IN CEMENT SLURRIES

CROSS REFERENCE TO RELATED APPLICATIONS

The following patent applications relate to the general field of this invention:

Ser. No. 303,735, filed Nov. 6, 1972;
Ser. No. 303,737, filed Nov. 6, 1972;
Ser. No. 303,743, filed Nov. 6, 1972;
Ser. No. 307,713, filed Nov. 17, 1972.

BACKGROUND OF THE INVENTION

1. Field of the Invention

This invention relates to improving the water loss properties of cement slurries during the cementing of oil wells. such is accomplished by incorporating within the cement slurry a polymer obtained by radiation induced polymerization.

2. Description of the Prior Art

Additives have been admixed with cement slurries to reduce the water loss from the cement slurry into the subterranean formation during cementing thereof. By preventing water loss, better cementing jobs can be obtained. Extensive water loss can result in formation damage resulting from cement filtrate waters and "flash setting," the latter resulting in a cement having undesirably low strength.

Agents such as carboxymethyl cellulose and hydroxyethyl cellulose, clays such as bentonite, and like additives have been added to reduce water loss. It is especially important to prevent water loss when cementing a porous formation from which the mud cake has been removed, i.e., the cement may become quickly dehydrated and undergo a so-called "flash set." Such an adversity may cause the pipe to stick and prevent the rotation or reciprocation desirable when wall scratches are used in the hole. "Wall scratches" are used to improve the bond between the cement and the formation, the scratchers actually scratching the interior of the well-bore so that the cement can more readily bond to the formation wall.

Good fluid loss control properties of the cement slurry are essential, especially to control the deposition of solids wherein a differential pressure exists between the cement slurry and the permeable zones of the formation to be cemented. Also, during the cementing of casing, if the formation has highly permeable zones, this may cause premature dehydration of the cement slurry and thus a less effective cementing job. Also, in squeeze cementing, controlled deposition facilitates filling all of the perforations without excessive squeeze pressures—if high fluid loss is realized, then of course controlled deposition will not be effected.

Other reasons exist for using radiation-induced polymers in cement slurries; for example, the slurries are easier to pump into the wellbore if they experience low water loss characteristics, and as a result, less energy is required to pump the cement slurry down into the wellbore. Also, lower pump pressures, in turn, can reduce water loss problems. Also, the slurry viscosity tends to maintain better stability if the water loss characteristics are reduced, thus enabling one to design the cementing job more effectively and efficiently.

The prior art has tried high molecular weight synthetic polymers as fluid loss control agents for cement slurries. Examples of such polymers include commercially available, partially hydrolyzed polyacrylamides.

SUMMARY OF THE INVENTION

Reduction in fluid loss from cement slurries as well as reduction of friction loss during the pumping of the cement slurry into the well bore is accomplished by incorporating within the aqueous phase of the cement slurry a water-soluble polymer obtained by radiation polymerization of acrylamide and/or methacrylamide and acrylic acid, methacrylic acid and/or alkali metal salts thereof. The aqueous solution to be polymerized contains 10-60% by weight of monomer; the monomer preferably is 25-99$ acrylamide and 75-1% sodium acrylate, by weight. Radiation intensity is preferably 250-1,000,000 rads/hr and the radiation dosage is preferably 500 to about 300,000 rads. The reaction product may be diluted with water and used directly, or the polymer may be extracted from the reaction product, dried and thereafter solubilized. Concentrations of about 0.001 to about 3.0 weight percent, all based on the aqueous phase of the slurry, are useful.

PREFERRED EMBODIMENTS OF THE INVENTION

The monomer is a combination of at least one compound selected from the group consisting of acrylamide and methacrylamide and at least one compound selected from the group consisting of acrylic acid, methacrylic acid alkali metal acrylate, and alkali metal methacrylate. Small amounts of additional ethylenically unsaturated copolymerizable monomers may also be used. Preferably, the monomer is a mixture of acrylamide and sodium acrylate. It is preferred that the monomer contain about 1–75% and preferably 15–55% and more preferably 20–50% of acrylic acid or alkali metal salt thereof, e.g., sodium acrylate.

Irradiation of the monomer is preferably carried out in aqueous solution containing about 10% to about 60% and more preferably about 15% to about 45% by weight of dissolved monomer. At the lower concentrations of monomer the product is generally a pourable polymer solution. At concentrations of above about 15% by weight the product is generally a nonpourable gel. A water-insoluble product may result at concentrations above about 60% monomer; thus, such high concentrations are undesirable. Of course, the particular limits of monomer concentration will depend, among other things, on the radiation conditions used, monomers used, and on the desired product for a particular use. The intrinsic viscosity of the polymer product increases as the monomer concentration increases, up to the point where the amount of cross-linking becomes appreciable, provided all other variables are held constant.

The aqueous monomer solution preferably should not contain more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. The radiation used has a wavelength below 3,500 Angstroms and preferably below 2,000 Angstroms. The radiation employed may be particulate or electromagnetic in nature. Examples include accelerated electrons, protons, neutrons, etc., as well as X-rays and gamma-rays, the latter being preferred.

Radiation intensity is preferably about 1,000 to about 300,000 rads/hr. and more preferably about 5,000 to about 200,000 rads/hr. Intensity directly influences the molecular weight of the polymer. That is, under otherwise identical conditions, low intensities generally give higher molecular weight polymers.

The radiation dose is preferably at least about 1,000 rads and more preferably at least about 1,500 rads. The maximum dose level is preferably not more than 100,000 rads and more preferably not more than 50,000 rads.

The radiation dose used directly influences the intrinsic viscosity and degree of monomer-to-polymer conversion. At a given radiation intensity and monomer concentration, an increase in radiation dose generally tends to result in a decrease in the intrinsic viscosity of the polymer produced. The radiation dose may also influence the water-solubility of the polymer, as it has been found that too high a radiation dose may render the resulting polymer water-insoluble. At the preferred dosage rates, conversion up to about 100% and preferably 80–100% of the monomer to polymer may be obtained without undue insolubilization.

The pH of the aqueous monomer solution is generally not critical except that very low pH values may cause insoluble products to form. Preferably the pH is within the range of 3–13 and more preferably about 8 to about 11. Although higher and lower pH values may be used, it should be recognized that hydrolysis tends to occur at pH values much below about 3 and more above about 11.

While the process described above may be used to prepare polymers having an intrinsic viscosity from about 6 to about 30 dl/g (deciliters per gram) in 2 normal sodium chloride at 25.5°C, the process is modified somewhat to prepare polymers having an intrinsic viscosity below about 6 dl/g or above about 30 dl/g in 2 normal sodium chloride at 25.5°C. Polymers having an intrinsic viscosity below about 6 dl/g are prepared by carrying out the polymerization reaction described above in the presence of a chain transfer agent. The chain transfer agent tends to restrict the growth of the active polymer chains, thereby resulting in the formation of polymers having lower molecular weights and lower intrinsic viscosities. The chain transfer agents which may be used herein may be any chain transfer agent which tends to restrict the growth of the polymer chains and thereby aid the formation of lower molecular weight and lower intrinsic viscosity polymers and which is soluble in the reaction medium. Illustrative examples of chain transfer agents which may be used include lower alkyl alcohols, such as methanol, ethanol, and isopropanol; halogenated compounds, such as trichloracetic acid; thiosorbitols containing two thio groups and four secondary hydroxyl groups; and mercaptans. The concentration of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 dl/g; but if desired, such polymers may be prepared in the presence of a chain transfer agent.

In order to prepare polymers having intrinsic viscosities above about 30 dl/g, the polymerization reaction is terminated when less than about 75% and preferably when less than about 60% by weight of the monomer has been converted to polymer. It has been found that the intrinsic viscosity of the resulting polymer tends to decrease as the percent conversion of monomer to polymer increases. For reasons of economy, it is not practical to tolerate conversions lower than about 20%.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60% by weight, provided the radiation dose used is sufficiently low to result in the formation of water-soluble polymers, the use of a monomer concentration of 60% by weight, an intensity of 250 rads per hour, and a dose of 300,000 rads, results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below of the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table 1 may be readily determined by minor modification of the reaction conditions given in Table 1 for the preparation of the polymer having the intrinsic viscosity nearest to the intrinsic viscosity of the polymer which is desired to be prepared. Such modification may be made in view of the above discussions on the effect of intensity, dose, monomer concentration, percent conversion of monomer to polymer, and chain transfer agent on the intrinsic viscosity of the polymer. For example, a polymer having an intrinsic viscosity of about 16 dl/g may be prepared by using the same reaction conditions employed in Example F in Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of water-soluble polymer which may be in the form of a pourable liquid or a nonpourable, rubbery gel, depending upon the polymer concentration and the intrinsic viscosity of the polymer. The viscosity of the polymer solution tends to increase as the polymer concentration and intrinsic viscosity of the polymer increase. Polymer solutions produced by the radiation may be admixed with water and used directly or the polymer solution may be concentrated by conventional means or it may be recovered in particulate form, i.e., dry form. For example, a nonpourable gel may be finely subdivided and the water removed by conventional drying techniques. Or, the water may be extracted from the subdivided gel with a water-miscible, volatile organic liquid which has no affinity for the copolymer, e.g., with methanol.

The polymer may contain cations which are preferably monovalent cations and more preferably sodium.

The polymers obtained from this radiation polymerization generally have relatively low Huggins constants. This constant is related to the linearity of the polymer where molecular weights are constant, i.e., for two copolymers having similar molecular weights but different Huggins constant, the lower Huggins constant indicates a more linear polymer. Polymers having Huggins constants below 1 and preferably below 0.7 and more preferably below 0.5 are most often used with this invention. In certain applications, a mixture of polymers having low, medium, and/or high Huggings constants may be desired to obtain improved oil recovery. A more detailed definition of Huggins constant and a method for determining the Huggins constant of a polymer is found in "Textbook of Polymer Chemistry," Billmeyer, Interscience Publishers, N.Y., 1957, pp. 128–139.

Intrinsic viscosity of the polymer can vary from less than about 1 to about 60 deciliters per gram and preferably is about 5 to about 35 deciliters per gram. The permeability of the reservoir rock will influence the desired intrinsic viscosity. Generally speaking, low intrinsic viscosities can be used with lower permeabilities. For example, permeabilities less tha about 50 md will permit the use of intrinsic viscosities less than about 10, whereas permeabilities of about 200 md or more will generally demand intrinsic viscosities greater than 20 and up to about 30–30. The intrinsic viscosity numbers referred to are measure in a 2 normal sodium chloride solution at 25.5°C. Of course, polymers having very high intrinsic viscosities are desired in very permeable reservoirs. It can generally be concluded that the effectiveness of the polymer increases as the intrinsic viscosity increases. Mixtures of polymers having different intrinsic viscosities may also be used.

The polymer may be solubilized in water before the cement is admixed. Water containing large amounts of polyvalent metallic cations is preferably avoided since such ions can adversely influence the viscosity and water-solubility of the polymer. The concentration of polyvalent metallic cations which may be present in the aqueous polymer solution is dependent upon the specific polyvalent metallic cation present, the temperature and pH of the solution, and the intrinsic viscosity and anionic content of the polymer. In general, the polymer becomes less tolerant of polyvalent metallic cations as the intrinsic viscosity, anionic content, and concentration of the polymer increase. The use of water containing substantial amounts of copper ions and/or iron ions is preferably avoided due to the adverse effect such ions may have on the polymer, such as water-solubility of the polymer, etc.

Shearing of the polymer upon dissolution and injection into the well bore should be avoided if maximum effectiveness as a water loss agent is desired. To obtain maximum polymer properties with the gel form of the polymer, the gel is first extruded and then cut into fine pieces, e.g., the size of BBs, and thereafter agitated in agueous solution at low shear rates. Pumps characterized by low shear rates as well as agitators run at low shear rates are especially useful. Water-soluble alkaline salts, that is, salts which give pH above 7 in water, such as alkali metal carbonates, may be added to the agueous solution to facilitate solubilization of the polymer. A preferred alkaline salt is sodium carbonate.

It may be desired that the copolymer, upon contact with the reservoir rock, be adsorbed or absorbed onto the reservoir rock. Where such is desired, the copolymer preferably has a very low anionic content, e.g., from above about 0 up to about 30% and preferably less than 15% of carboxylic groups onto the copolymer chain. That is, the copolymer contains less than 30% and preferably less than 15% sodium acrylate. Also, preferably, the polymer has at least some branching onto the main polymer chain. For a given molecular weight polymer, this means that the polymer has a relatively high Huggins constant which constant indicates branching of the polymer.

Where it is desired that the polymer have some reduced degree of water solubility, for example, about 20% water solubility at about 100°F, the polymer can be partially cross-linked. Cross-linking can be effected by overradiating, i.e., by continuing the radiation after all monomer has been converted to polymer, or by continuing the radiation after the water solubility of the polymer begins to decrease. Polyfunctional monomers such as ethylenically unsaturated water-soluble, copolymerizable monomers containing more than one ethylenically unsaturated double bond, may be used to reduce the water solubility of the polymer. The polyfunctional monomers may be used in concentrations of about 0.01 to about 10%, preferably about 0.05 to about 5% and more preferably about 0.1 to about 3% by weight. The copolymerizable polyvalent monomers are added to the aqueous solution before irradiation. Examples of such monomers include methylene bisacrylamide, polyacrylates such as sorbitol polyacrylates and polyallyl ethers of sorbitol, e.g., hexallylsorbitol.

Where it is desired to have polymers having the highest intrinsic viscosities, the radiation polymerization should take place at low radiation intensities, low conversions, and high monomer concentrations. Of course, the above relative values are within the previously indicated reaction conditions set out herein.

To produce polymers having high intrinsic viscosities, e.g., about 30 to about 60, and low Huggins constants, the radiation intensity is preferably 5,000 to about 50,000 rads/hr and the monomer concentration is preferably about 20 to about 60% and preferably 25 to 50% and the conversion is preferably about 15 to about 75% and more preferably less than about 50%.

The polymer is preferably present in concentrations of about 0.001 to about 3.0 weight percent, more preferably about 0.002 to about 2.0 weight percent and more preferably about 0.005 to about 1.0 weight percent within the water phase of the cement slurry. Of course, other additives besides the polymer, water, and cement may be present in the cement slurry, but it is preferred that the additives not react with the polymer to sufficiently override the beneficial influence of the polymer to the cement slurry. These additives are known in the art as well as the different methods of cementing wells, including cementing the casing within the well bore as well as cementing "thief" zones, creating impermeable barriers within a horizontal strata within a well bore in fluid communication with the formation.

Cement slurries useful with this process generally contain less than about 30% to about 60% or more water. Cementing of injection wells, production well (both oil and water), disposal wells, "thieving" zones during drilling operations, "squeeze" cementing of formations or zones, and like operations are applicable with this invention.

The polymers of this invention can be selected to exhibit high viscosities at low shear rates—this property facilitates suspension of particles and agents within the cement slurry, etc. Also, the polymer exhibits low viscosities at high shear rates.

Also, the polymer can be selected to have improved shear degradation characteristics. That is, polymers generally tend to degrade as they pass through a region of high shear rate, e.g., as the cement slurry passes through valves, pipe fittings, etc. By selecting a polymer with some degree of branching or some degree of cross-linking, the polymer will be less sensitive to shear degradation.

After the formation has been contacted with the cement slurry of this invention, drilled through and optionally acidized, it may be desirable to treat the formation with an aqueous hydrazine or hypochlorite solution, or a strong mineral acid to restore the permeability of the formation that has been contacted with the polymer. That is, the hydrazine, hypochlorite, or acid tends to chemically degrade the polymer and thus tends to restore at least some of the permeability to the reservoir rock that has been contacted with the polymer.

The following examples are presented to teach specific working embodiments of the invention; such are not meant to limit the interpretation of the invention. Unless otherwise specified, all percents are based on volume.

Preparation of the Copolymers

Polymers used for testing are prepared with Cobalt 60 gamma radiation; radiation intensities and dosages are outlined in Table 1. The process for preparing Polymer A is explained; preparation of the other polymers is similar except for variations indicated in Table 1.

To 24,000 grams of deionized water there are added 692 grams of sodium hydroxide. After cooling the solution to 30°C, 1,250 grams of acrylic acid are added. Thereafter, 5,000 grams of acrylamide are added while mixing and the pH is adjusted to 9.4. The resulting solution contains 75% by weight acrylamide (AAd) and 25% by weight sodium acrylate (NaAA) and has a total monomer concentration of 21.4% by weight. The solution is purged with $N_2$ for 20 minutes and thereafter sealed. The sample is irradiated with cobalt 60 gamma radiation at an intensity of 18,000 rads/hr (R/hr) to a total dose of 8,800 rads (R). The resulting product is a gel-like mass.

A portion of the gel is weighed, and thereafter extracted with methanol to precipitate the polymer. The polymer is dried in a vacuum oven at 36°C and 0.02 psia for 24 hours and then to a constant weight at 110°C. Weight of the dried product divided by the theoretical weight gives a monomer conversion of 93%.

A portion of the gel is solubilized in water by first extruding it through a "meat" grinder; the spaghetti-like extrusion is cut into BB size particles and then dissolved in water by agitating at a low rpm to prevent substantial shearing of the polymer.

The residue of the gel is recovered in dry powder form by first extruding the gel, then dissolving it in water and thereafter adding methanol to precipitate the polymer out of the solution. The polymer is then ground to less than 20-mesh size and finally dried at 60°C in a vacuum oven.

The intrinsic viscosity is measured at 25.5°C in a 2 normal NaCl aqueous solution. The Huggins constant is measured by the method described in "Textbook of Polymer Chemistry," Billmeyer, Interscience Publishers, New York, 1957, pp. 128-139.

The monomer used in Sample G is dissolved in water containing 9.1% by weight of methanol.

TABLE 1

INFORMATION ON POLYMER SAMPLES

| Polymer | AAd/NaAA Wt. Ratio | Monomer Concentration (%) | pH | Intensity (R/hr.) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---|---|---|---|---|---|---|---|---|---|---|---|
| A | 75/25 | 21 | 9.4 | 18,000 | 8,800 | — | 93 | 23.7 | 23.0 | — | 0.19 |
| B | 70/30 | 21 | 9.4 | 20,000 | 9,800 | — | 93 | 22 | 20 | 0.19 | 0.19 |
| C | 60/40 | 22 | 9.4 | 20,000 | 10,300 | — | 93 | 23.0 | 23.0 | — | — |
| D | 70/30 | 30 | 9.5 | 230,000 | 50,000 | — | 91 | 14 | 12.8 | — | 0.38 |
| E | 70/30 | 40 | 9.5 | 10,000 | 1,760 | — | 34 | 39.4 | 33 | 0.06 | — |
| F | 70/30 | 24 | 9.5 | 100,000 | 15,000 | — | 86 | 18.5 | — | 0.24 | — |
| G | 70/30 | 27 | 9.5 | 20,000 | 11,500 | MeOH 9.1 | 91 | 12.4 | 11.7 | 0.31 | 0.38 |
| H | 70/30 | 13 | 9.5 | 220,000 | 44,000 | MeOH 15 | 96.5 | 1.0 | — | — | — |
| I | 70/30 | 13 | 9.5 | 220,000 | 44,000 | — | 96.5 | 5.8 | — | 0.64 | — |
| J | 70/30 | 25 | 9.5 | 220,000 | 44,000 | MeOH 15 | 84.0 | 6.9 | — | 0.52 | — |
| K | 70/30 | 24 | 9.5 | 20,000 | 7,660 | — | 86.7 | 28.2 | — | 0.13 | — |
| L | 70/30 | 30 | 9.5 | 20,000 | 2,667 | — | 54 | 31.0 | — | 0.04 | — |
| M | 90/10 | 40 | 9.6 | 10,000 | 1,350 | — | 24 | 53 | — | <0.02 | — |

EXAMPLE I

To show that the copolymers of this invention impart unexpected results over polymers and copolymers of the prior art, this example is presented.

Fluid loss control properties are simulated in the laboratory by flooding water-saturated reservoir core samples with aqueous polymer solutions at a frontal velocity of 10 ft/day. The permeability reduction of the front section of the core is determined by first flooding the core with water (containing 500 ppm total dissolved solids) at the velocity of 10 ft/day and thereafter flooding the cores with the aqueous polymer solutions indicated in Table 2. A high permeability reduction of cores is desirable to minimize fluid loss from a cement slurry. The aqueous polymer solutions are dissolved in water containing Table 2-indicated amounts of total dissolved solids (TDS).

TABLE 2

RESULTS OF POLYMER FLOODING IN 100-200 md SANDSTONE CORES

| Run | Polymer | Brookfield Viscosity at 6 rpm (cp) | Initial Permeability (md) | Flushed Permeability (md) | Permeability Reduction |
|---|---|---|---|---|---|
| 1 | A | 26.7 | 107 | 0.5 | 214 |
| 2 | B | 32.2 | 142 | 1.5 | 93 |
| 3 | C | 27.2 | 132 | 0.9 | 150 |
| 4 | D | 20.0 | 110 | 0.6 | 178 |
| 5 | B | 8.8 | 159 | 1.3 | 124 |
| 6 | B | 7.1 | 97 | 0.7 | 143 |
| 7 | Partially hydrolyzed polyacrylamide | 16.3 | 135 | 2.5 | 54 |
| 8 | Copolymer No. 1 | 39.0 | 123 | 2.6 | 47 |
| 9 | Copolymer No. 2 | 38.5 | 134 | 5.5 | 25 |

Runs 1–4 contains 700 ppm polymer dissolved in water containing about 500 ppm TDS.
Run 5 contains 300 ppm polymer dissolved in water containing about 500 ppm TDS.
Run 6 contains 700 ppm polymer dissolved in water containing 18,000–20,000 ppm TDS.
Runs 7–9 contain 800 ppm polymer dissolved in water containing about 500 ppm TDS.
Copolymer No. 1 = a commercially available, anionic acrylamide copolymer obtained by a chemically catalyzed polymerization reaction; has an intrinsic viscosity of 12.5 and a Huggins constant of 0.34.
Copolymer No. 2 = a commercially available, very high molecular weight, strongly anionic copolymer of acrylamide obtained by a chemically catalyzed polymerization reaction; has an intrinsic viscosity of 22.0 and a Huggins constant of 0.18
Partially hydrolyzed polyacrylamide = a commercially available, partially hydrolyzed, high molecular weight polyacrylamide obtained by a chemically catalyzed polymerization reaction; has an intrinsic viscosity of 12.7 and a Huggins constant of 0.56.

The above data indicate that Runs 1–6, as compared to Runs 7–9, exhibit higher permeability reductions than do the commercially available polymers and copolymers. Such large permeability reduction is a direct indication of the fluid loss control properties of a cement slurry when such polymers are used. Polymer E of Table 1 at the same concentration and water conditions as copolymers No. 1 and No. 2, has a Brookfield viscosity at 6 rpm of 52 cp.

It is not intended that this invention be limited by the above examples. Rather, compositions and components of cementing slurries known in the art and which are obvious to those skilled in the art are intended to be incorporated within the scope of this invention as defined in the specification and appended claims.

What is claimed is:

1. In the process of cementing a well in fluid communication with a subterranean reservoir wherein a cement slurry is injected down the well bore, the cement slurry containing a high molecular weight polymer dissolved in the water phase of the cement slurry to inhibit fluid loss from the cement slurry, the step comprising incorporating within the aqueous phase of the cement slurry a polymer obtained as a product of high energy ionization radiation polymerization of at least one monomer selected from the group consisting of acrylamide and methacrylamide and at least one monomer selected from the group consisting of acrylic acid, methacrylic acid, alkali metal acrylate, and alkali metal methacrylate in concentrations of about 10% to about 60% by weight dissolved monomer in an aqueous medium, the radiation intensity being about 250 to about 1,000,000 rads/hr and the radiation dose being about 500 rads to about 300,000 rads.

2. The process of claim 1 wherein one of the monomers is acrylic acid.

3. The process of claim 1 wherein one of the monomers is methacrylic acid.

4. The process of claim 1 wherein one of the monomers is sodium acrylate.

5. The process of claim 1 wherein one of the monomers is sodium methacrylate.

6. The process of claim 1 wherein one of the monomers is acrylamide.

7. The process of claim 1 wherein the polymer is a copolymer obtained by copolymerizing acrylamide and sodium acrylate.

8. The process of claim 1 wherein the radiation intensity is within the range of about 1,000 to about 300,000 rads/hr.

9. The process of claim 1 wherein the radiation dose is within the range of about 1,000 to about 100,000 rads.

10. The process of claim 1 wherein the aqueous medium is at a pH within the range of about 3 to about 13.

11. The process of claim 1 wherein the pH of the aqueous medium is within the range of about 8 to about 11.

12. In the process of cementing a well in fluid communication with a subterranean reservoir wherein a cement slurry is injected down the well bore, the cement slurry containing a high molecular weight polymer dissolved in the aqueous phase of the cement slurry to inhibit fluid loss from the slurry, the step comprising incorporation within the water of the cement slurry a polymer obtained as a product of radiation copolymerization of an aqueous solution comprised of about 10 to about 60% of a mixture of about 25 to about 99% of acrylamide and about 75 to about 1% of sodium acrylate, the radiation intensity being within the range of about 250 to about 1,000,000 rads/hr. and the radiation dose being about 500 rads to about 300,000 rads.

13. The process of claim 12 wherein the copolymer obtained from the radiation polymerization is in the form of a gel.

14. The process of claim 12 wherein the aqueous medium contains from about 85% to about 45% of acrylamide and about 15% to about 55% of sodium acrylate.

15. The process of claim 12 wherein the radiation is gamma radiation.

16. The process of claim 12 wherein the sodium acrylate is present in a concentration of about 20% to about 50%.

* * * * *